United States Patent
Lee et al.

(10) Patent No.: US 10,384,375 B2
(45) Date of Patent: Aug. 20, 2019

(54) MICRO DEVICE TRANSFERRING APPARATUS, METHOD FOR TRANSFERRING MICRO DEVICE, AND METHOD FOR FABRICATING TRANSFERRING APPARATUS

(71) Applicant: GWANGJU INSTITUTE OF SCIENCE AND TECHNOLOGY, Gwangju (KR)

(72) Inventors: Jongho Lee, Gwangju (KR); Byungsuk Yoo, Gwangju (KR)

(73) Assignee: GWANGJU INSTITUTE OF SCIENCE AND TECHNOLOGY, Gwangju (KR)

(*) Notice: Subject to any disclaimer, the term of this patent is extended or adjusted under 35 U.S.C. 154(b) by 558 days.

(21) Appl. No.: 14/940,077

(22) Filed: Nov. 12, 2015

(65) Prior Publication Data

US 2016/0185035 A1    Jun. 30, 2016

(30) Foreign Application Priority Data

Dec. 29, 2014    (KR) .................. 10-2014-0191947

(51) Int. Cl.
| | | |
|---|---|---|
| *B29C 59/16* | (2006.01) | |
| *B29C 59/00* | (2006.01) | |
| *B29C 39/02* | (2006.01) | |
| *B29C 35/08* | (2006.01) | |

(52) U.S. Cl.
CPC .... *B29C 39/026* (2013.01); *B29C 2035/0827* (2013.01)

(58) Field of Classification Search
CPC ..................... B29C 39/026; B29C 2035/0827
See application file for complete search history.

(56) References Cited

U.S. PATENT DOCUMENTS

2016/0093600 A1* 3/2016 Bower .................. H01L 25/167
257/89

OTHER PUBLICATIONS

[Supportive Materials for Exception to Loss of Novelty] Yoo, Byungsuk et al., "Elastomeric Angled Microflaps With Reversible Adhesion for Transfer-Printing Semiconductor Membranes Onto Dry Surfaces", Published in the ACS Applied Materials & Interfaces (Impact Factor: 6.72). Oct. 2014; 6(21). pp. 19247-19253 dated Oct. 21, 2014.

* cited by examiner

*Primary Examiner* — Robert J Grun
(74) *Attorney, Agent, or Firm* — Hauptman Ham, LLP

(57) ABSTRACT

A micro device transferring apparatus includes: a base; and a stamping array disposed on the base. The stamping array includes at least two transferring projections protruding from the base at a predetermined spacing therebetween. According to the present disclosure, the adhesion between a micro device and a target substrate can be enhanced, and the transferring apparatus can be used repeatedly and simply controlled so that the cost for handling the micro device can be saved. In addition, the positions of micro devices can be scaled in multiple dimensions, so that the micro devices can be mounted in a scalable manner.

14 Claims, 23 Drawing Sheets

MICRO DEVICE TRANSFERRING APPARATUS, METHOD FOR TRANSFERRING MICRO DEVICE, AND METHOD FOR FABRICATING TRANSFERRING APPARATUS

CROSS-REFERENCE TO RELATED APPLICATIONS

This application claims the priority of Korean Patent Application No. KR 10-2014-0191947 filed on Dec. 29, 2014, in the Korean Intellectual Property Office, the disclosure of which is incorporated herein by reference.

BACKGROUND

1. Technical Field

The present disclosure relates to a micro device transferring apparatus, a method for transferring a micro device, and a method for fabricating a transferring apparatus. In particular, the present disclosure relates to a transferring apparatus capable of transferring a micro device from a location to another efficiently without causing damage to its electrical performance, a method for transferring a micro device, and a method for fabricating a transferring apparatus.

2. Description of the Related Art

Micro devices, represented by semiconductors, have evolved rapidly and became essential devices for modern industries. Typically, a micro device is fabricated on an original substrate made of an inorganic material such as silicon, and then is transferred to a target substrate. The present disclosure is directed to a transferring apparatus that transfers a micro device from an original substrate to a target substrate, a method for transferring a micro device, and a method for fabricating a transferring apparatus.

It is to be noted that the micro device is not limited to semiconductors but includes a variety of articles such as films, small components, etc. It is also to be noted that the transferring not only refers to a process moving a micro device from an original substrate to a target substrate but also refers to any transferring process moving a micro device from a location where the micro device is placed to a target location. These equally apply to the detail descriptions below.

As a recently developed method for transferring a micro device to a target substrate, PDMS stamps have been introduced that attaches a micro device to a stamp to move it to a target substrate. In this method, the micro device is detached from the stamp by way of removing the stamp or by disposing an adhesive layer on the target substrate so that the micro device is attached to the target substrate to detach the stamp from the micro device.

However, the approach of removing the stamp is inefficient since the stamp can be used only once as a sacrificial layer. In addition, the approach of disposing the adhesive layer on the target substrate has a problem in that the adhesive layer deteriorates the efficiency of the target substrate.

SUMMARY

Under the circumstances, it is one aspect of the present disclosure to provide a transferring apparatus that solves decrease in efficiency due to an adhesive layer and can be repeatedly used, a method of transferring a micro device, and a method of fabricating the same. Additionally, thermal, electrical resistance can be improved at the contact surface between the target substrate and the micro device, and decrease in physical performance can be eliminated which is caused when the adhesive layer is employed.

In accordance with one aspect of the present disclosure, a micro device transferring apparatus includes: a base; and a stamping array disposed on the base. The stamping array includes at least two transferring projections protruding from the base at a predetermined spacing therebetween.

In accordance with another aspect of the present disclosure, a method of transferring a micro device includes: attaching a micro device to an transferring apparatus by bring adhesive transferring projections in contact with the micro device to impart a load thereon; retracting the transferring apparatus in a first direction to separate the micro device from an original location; bring the micro device in contact with a target substrate; and retracting the transferring apparatus in a second direction to separate the micro device from the transferring apparatus.

In accordance with another aspect of the present disclosure, a micro device transferring apparatus includes: a base; and a stamping array disposed on the base, wherein the stamping array comprises at least two transferring projections protruding from the base, and wherein an adhesive force between the transferring projections and the micro device is adjusted by varying at least one of a retraction direction of the transferring projection, a retraction speed of the transferring projections and a load imparted on an interface between the transferring projections and the micro device with the micro device attached to the transferring projections, thereby controlling the attaching/detaching of the micro device to/from the transferring projections.

In accordance with another aspect of the present disclosure, a method for fabricating a micro device transferring apparatus includes: forming a mold in a substrate; and injecting PDMS into the mold to form a transferring apparatus, wherein the forming the mode in the substrate comprises applying a photosensitive material onto the substrate, applying a photoresist, and irradiating light onto the photosensitive material with the photoresist applied at two different directions.

BRIEF DESCRIPTION OF THE DRAWINGS

The above and other aspects, features and advantages of the present disclosure will become apparent from the following description of exemplary embodiments given in conjunction with the accompanying drawings, in which:

FIGS. 7 to 10 are photographs showing how the micro device transferring apparatus according to an exemplary embodiment of the present disclosure works;

DETAILED DESCRIPTION

Embodiments of the present disclosure will now be described in detail with reference to the accompanying drawings. However, it should be noted that the idea of the present disclosure is not limited to the embodiments set forth herein; and those skilled in the art, having benefit of this detailed description, will appreciate that other embodiments are possible by adding, modifying and eliminating elements, which are also deemed to be within the scope of the present disclosure.

It is to be understood that the micro device is not limited to semiconductors but includes a variety of articles such as films, small components, marks, etc. Preferably, the present disclosure is more advantageous for devices such as semiconductors which require high precision. It is also to be noted that the transferring not only refers to a process moving a micro device from an original substrate to a target substrate but also refers to any transferring process moving a micro device from a location where the micro device is placed to a target location.

Figure 1:
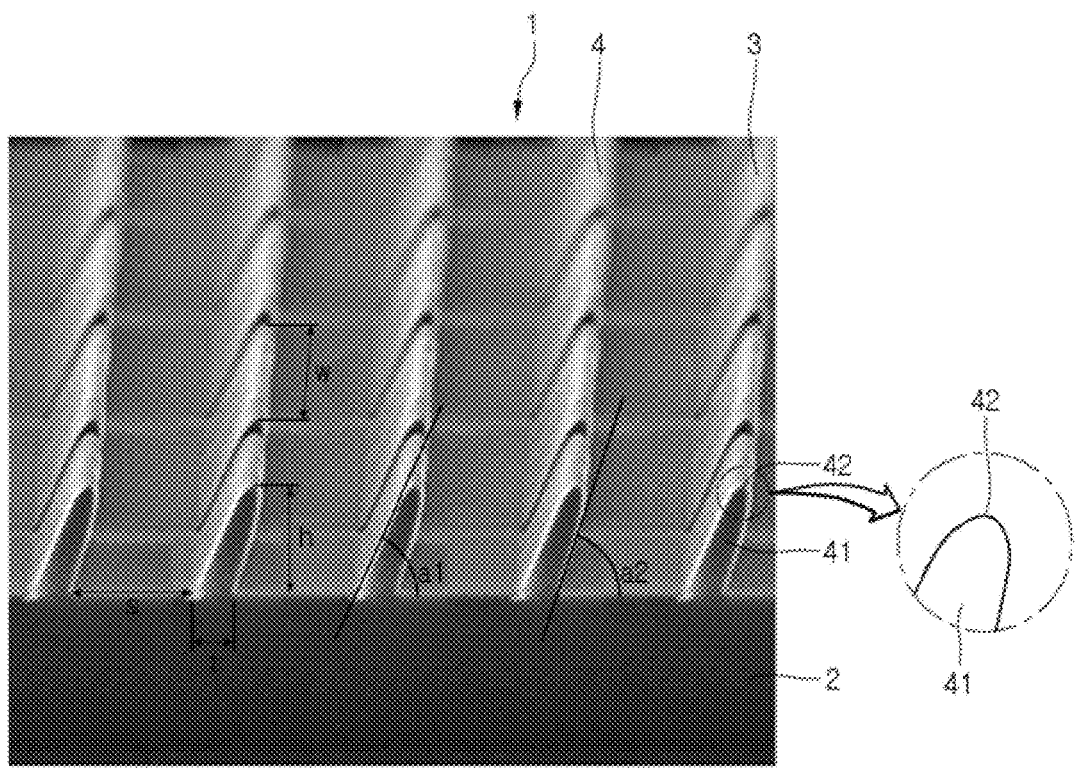
FIG. 1 is an enlarged photograph of a part of a micro device transferring apparatus according to an exemplary embodiment of the present disclosure.

FIG. 1 is an enlarged photograph of a part of a micro device transferring apparatus according to an exemplary embodiment of the present disclosure.

Referring to FIG. 1, the transferring apparatus 1 includes a base 2 and a stamping array 3 on the base 2. The stamping array 3 is provided with at least two transferring projections 4 at positions determined according to a predetermined rule.

The transferring projections 4 may be inclined at a certain angle with respect to the normal line to the base 2. The portions where the transferring projections 4 come in contact with the base 2 may be arranged in a direction parallel to one of the lateral lines of the base 2. All of the transferring projections 4 may be arranged in the same pattern. The stamping array 3 may have at least four transferring projections 4. The transferring projections 4 may be equally spaced apart from one another in a direction. The transferring projections 4 may be arranged in the longitudinal and lateral directions, equally spaced apart from one another in each of the directions.

For example, each of the transferring projections may have the width (w) of 500 μm, the lateral spacing (s) of 75 μm, the height (h) of 70 μm, and the bottom thickness (t) of 25 μm. Although not specifically given, the spacing between the transferring projections in the longitudinal direction may be determined so that the transferring projections 4 do not come in contact with one another even if they are deformed and one does not restrict others' movement.

Each of the transferring projections 4 may include a body 41 protruding from the base 2 in an inclined direction and an end 42 formed at the tip of the body 41. The body 41 may narrow toward the end 42. The body 41 has such a shape for two reasons: one for allowing the body 41 to be easily bent, and the other for ensuring that the micro device is attached and fixed thereto. The end 42 may have a rounded shape. One reason for making the end 42 rounded is to allow the transferring projections 4 to easily restore the original shape by the resilience of the elastic body 41 even if the transferring projections 4 are attached to the base 2.

The body 41 of each of the transferring projections 4 may be inclined at approximately 70° in a direction. In this example, a larger angle a2 made by the base 2 and one side of the cross-section of the body 41 is 72°, and a smaller angle a1 made by the base 2 and the other side of the cross-section of the body 41 is 65°.

The base 2 and the transferring projections 4 may be made of the same material and may be integrated with each other. Preferably, the base 2 and the transferring projections 4 may be produced together during the same process with the same material. The material for the base 2 and the transferring projections 4 may include adhesive elastomeric substance, for example, polydimethylsiloxane (PDMS) or polyurethane. The elastomeric substance may refer to a material which is adhesive and elastic. When the transferring projections 4 press against the micro device at a predetermined pressure, the micro device attaches to the transferring projections 4 by the adhesive force of the elastomeric substance.

Figure 2:
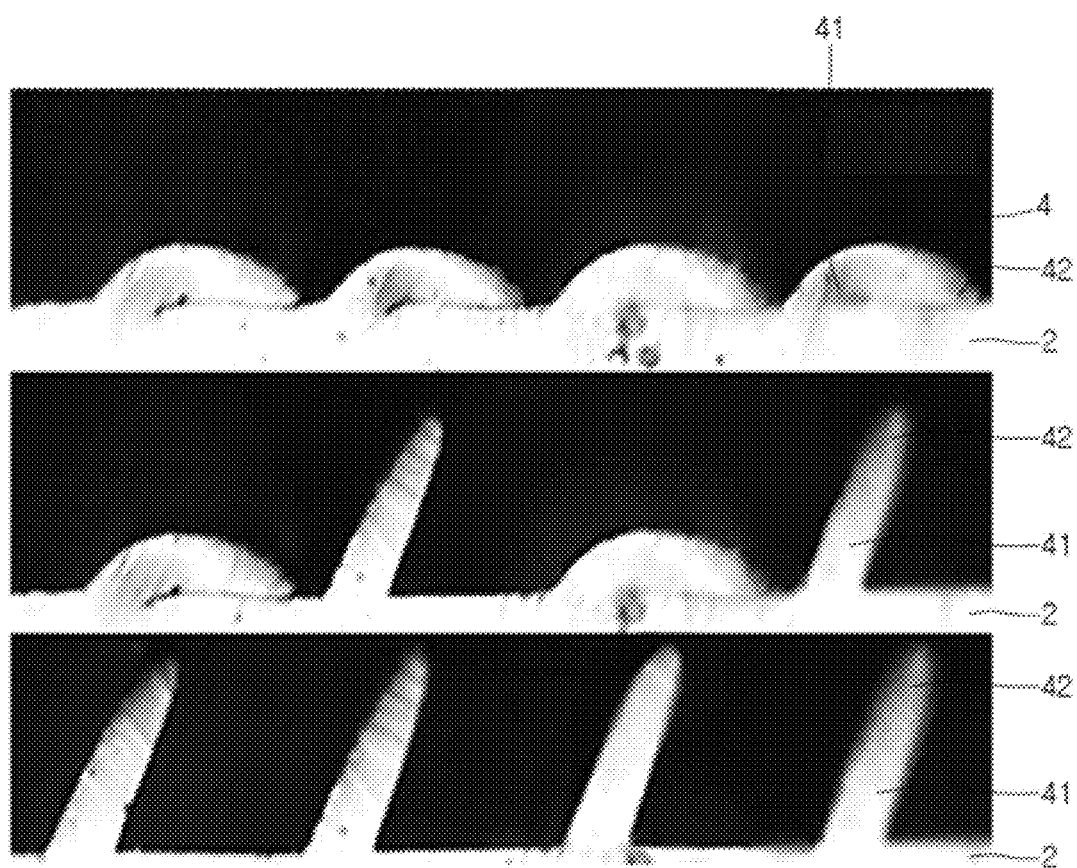
FIG. 2 is a view showing how the transferring projections work in the micro device transferring apparatus, according to an exemplary embodiment of the present disclosure.

FIG. 2 is a view showing how the transferring projections work in the micro device transferring apparatus, according to an exemplary embodiment of the present disclosure.

Referring to FIG. 2, the picture on the top shows the transferring projections 4 disposed on the base 2. Specifically, when an external pressure is imparted to the transferring projections 4, the transferring projections 4 lie down in the inclined direction in which the transferring projections 4 are extended, so that the transferring projections 4 attach to the base 2. This is because all of the transferring projections 4 and the base 2 are made of an adhesive elastomeric substance and thus have adhesive force. However, the transferring projections 4 can restore the original shape after a while by the elastic force of the elastomeric substance. The pictures in the middle and on the bottom show the course that the transferring projections 4 restore the original shape as time passes.

The transferring projections 4 can restore the original shape easily because the end 42 of each of the transferring projections 4 has a rounded shape so that the end 42 can be easily detached from the base 2. The difference is emphasized even more clearly in comparison with an end having a sharp point that attaches to the base 2 at nearly zero contact angle.

FIGS. 3 to 6 are views schematically showing a method for transferring a micro device according to an exemplary embodiment of the present disclosure.

Figure 3:
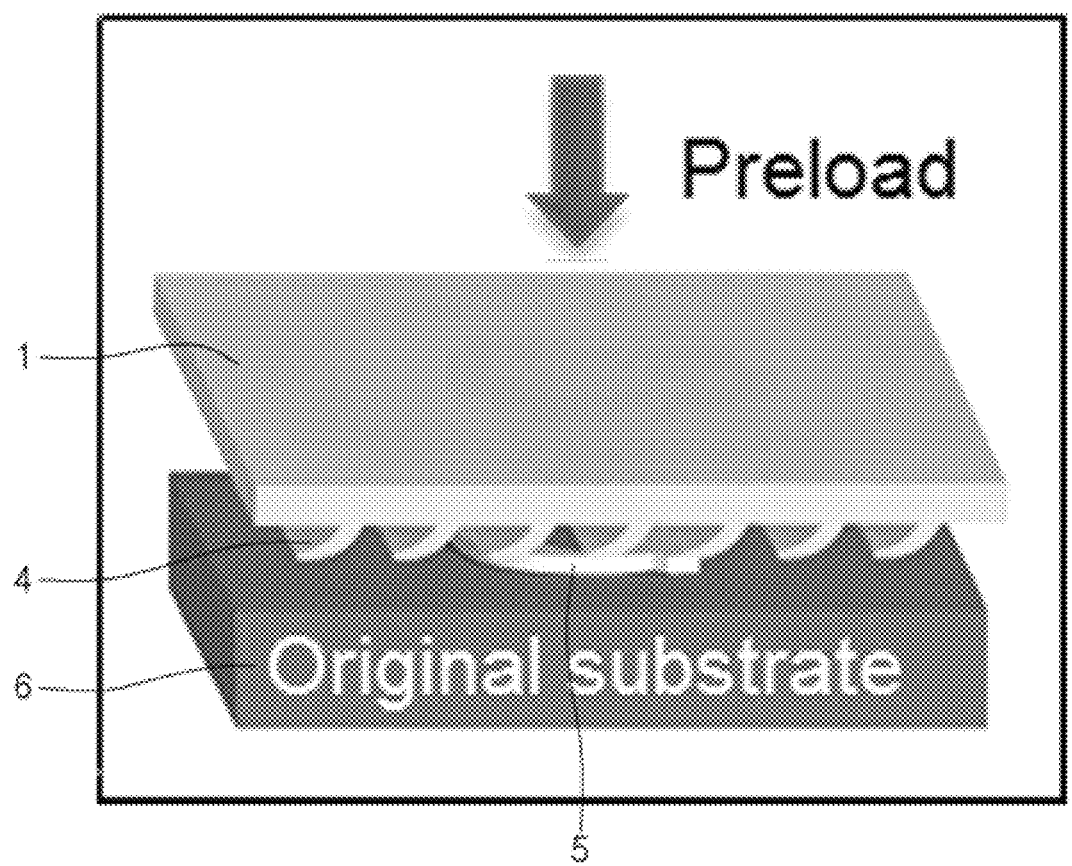
FIGS. 3 to 7 are views schematically showing a method for transferring a micro device according to an exemplary embodiment of the present disclosure.

Referring to FIG. 3, a transferring apparatus 1 is pressed at a predetermined load (preload) against an original substrate 6 on which a G-shaped micro device 5 is produced, for example. Then, the transferring projections 4 inclined in a direction are further bent from the inclined direction and are deformed, so that the micro device 5 attaches to a plane created by the ends of the deformed transferring projections 4.

Figure 4:
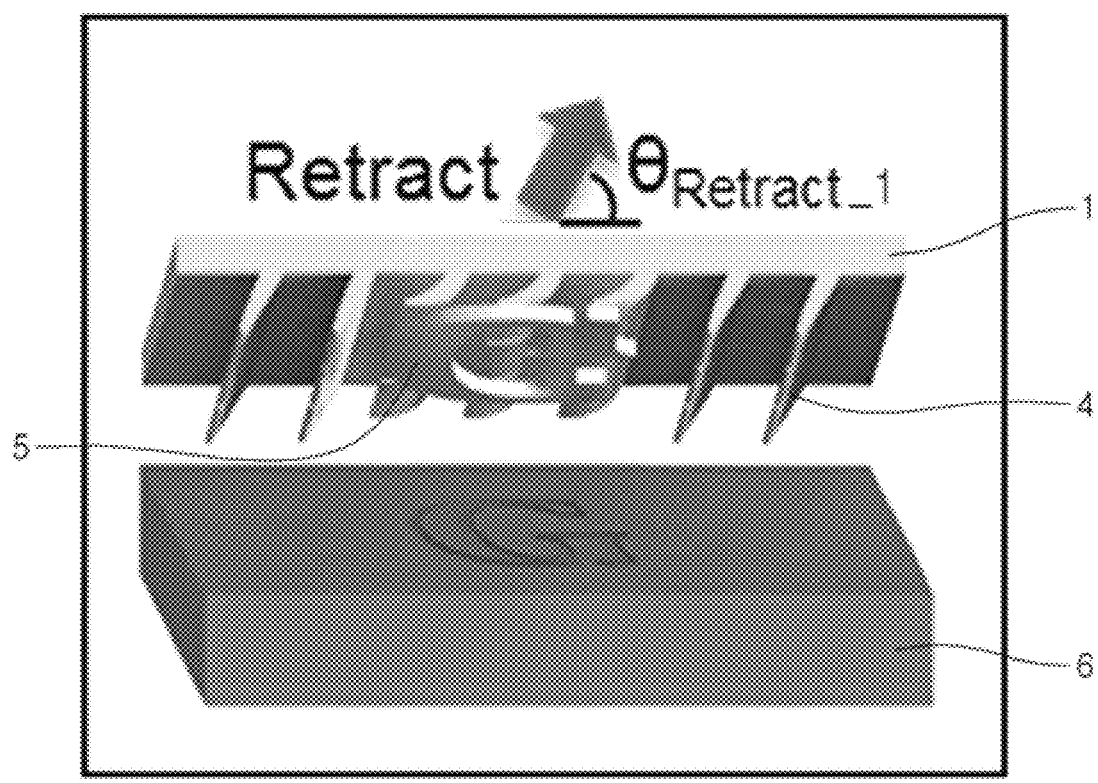

Referring to FIG. 4, the transferring apparatus 1 is retracted in a direction extended from the inclined direction of the transferring projections 4. There may be a difference in the angle between the direction in which the transferring apparatus 1 is retracted $\theta\_retract\_1$ and the inclined direction of the transferring projections 4. However, it is desirable to move the transferring apparatus 1 in the same direction as the inclined direction of the transferring projections 4 with respect to the normal line of the base 2. In this manner, the adhesive force between the micro device 5 and the transferring projections 4 is maximized, and the micro device can be separated from the original substrate 6. In other words, as the transferring apparatus 1 is retracted in the direction extended from the inclined direction of the transferring projections 4, the contact surface between the transferring projections 4 and the micro device 5 tends to be separated from each other as a whole. Accordingly, the transferring projections 4 and the micro device 5 cannot be easily separated from each other.

The adhesive force between the micro device 5 and a target substrate 7 may be obtained by the van der Waals force, static electricity, etc. Accordingly, when the micro device 5 is detached from the original substrate 6, the adhesiveness between the micro device 5 and the target substrate 7 obtained by the van der Waals force and static electricity is to be less than the adhesiveness between the transferring projections 4 and the micro device 5. The relative magnitude of the adhesive forces can be controlled by the shape of the transferring projections 4 and the moving direction of the transferring apparatus 1.

Figure 5:
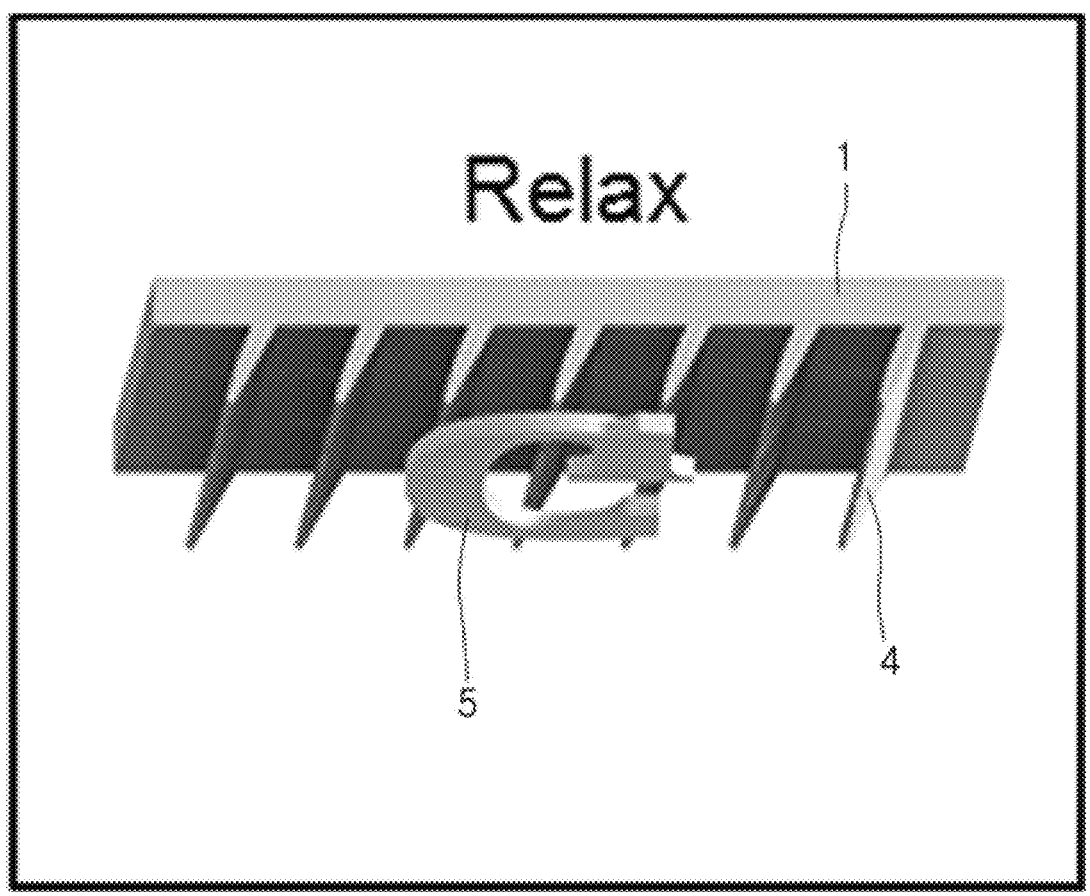

Referring to FIG. 5, the micro device 5 as being attached to the transferring apparatus 1 may be moved to the target substrate 7. At this time, the transferring projections 4 may restore the original shape by the resilience. Even so, the micro device 5 can be attached to the transferring projections 4 since the transferring projections 4 are inclined.

Since there is neither van der Waals force nor static electricity that contribute the adhesive force between the micro device 5 and the original substrate 6, the micro device 5 can be attached to the transferring apparatus 1 even though the transferring projections 4 and the micro device 5 do not create a large contact surface, i.e., a large adhesive force.

Figure 6:
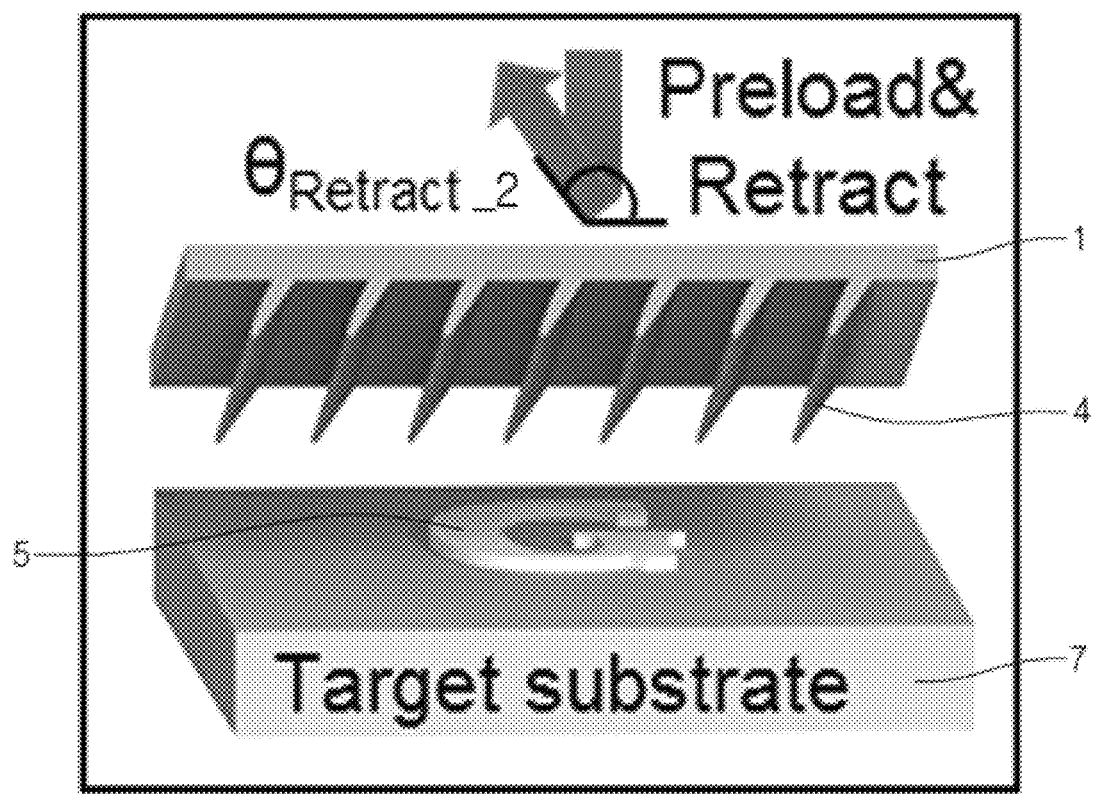

Referring to FIG. 6, the micro device 5 is moved to a desired position on the target substrate 7. Then, the transferring apparatus 1 is slightly pressed and retracted in a different direction from the inclined direction of the transferring projections 4. That is, the transferring apparatus 1 may be retracted at the angle θ_retract_2 that is a different from the angle of the inclined direction of the transferring projections 4. By moving the transferring apparatus in the different direction, the transferring projections 4 and the micro device 5 can be easily separated from each other. It would be understood that the transferring projections 4 are separated from the micro device 5 in such a manner that the transferring projections 4 are gradually separated from one side (specifically, the side of the contact surface closer to the base 2) of the contact surface between the transferring projections 4 and the micro device 5 as the transferring apparatus 1 moves in the direction different from the inclined direction of the transferring projections 4.

The adhesive force between the micro device 5 and the target substrate 7 may be obtained by the van der Waals force, static electricity, etc. Accordingly, when the micro device 5 is transferred to the target substrate 7, the adhesive force between the micro device 5 and the target substrate 7 obtained by the van der Waals force and static electricity is greater than the adhesive force between the transferring projections 4 and the micro device 5.

The directions in which the transferring apparatus 1 is retracted when the micro device 5 is separated from the original substrate 6 (θ_retract_1) and when the micro device 5 is transferred to the target substrate 6 (θ_retract_1), respectively, will be described in more detail below.

FIGS. 7 to 10 are photographs showing how the micro device transferring apparatus according to an exemplary embodiment of the present disclosure works.

Figure 7:
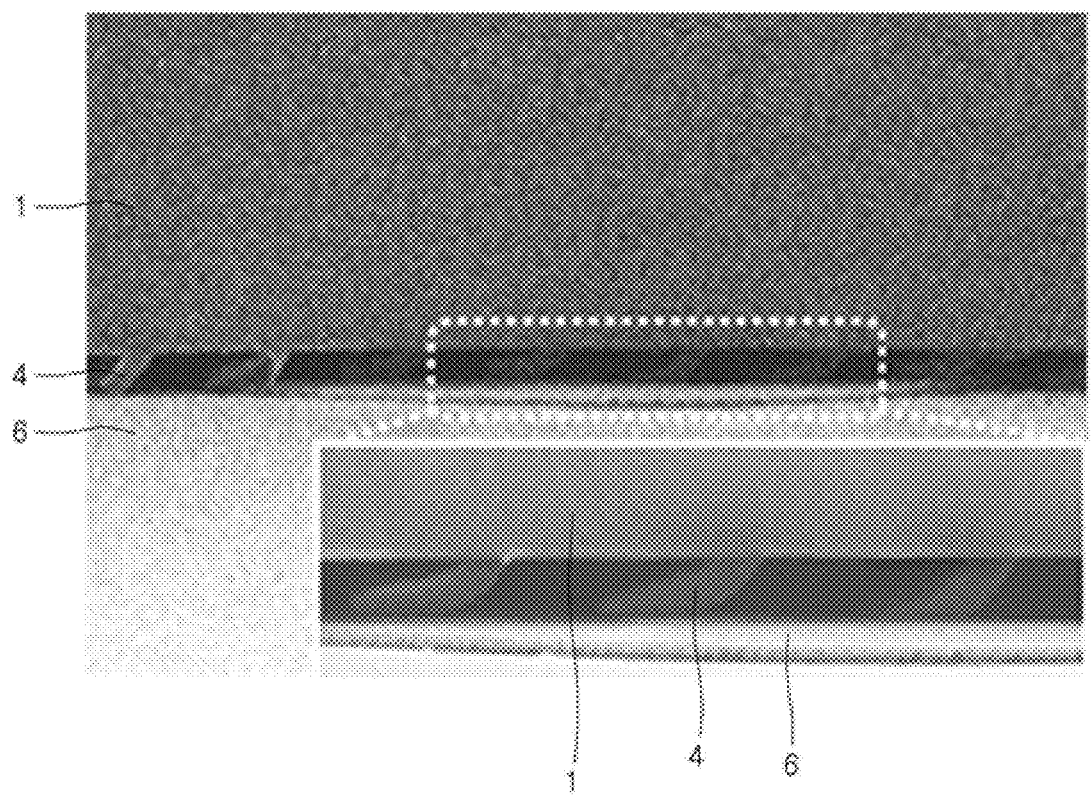
Figure 8:
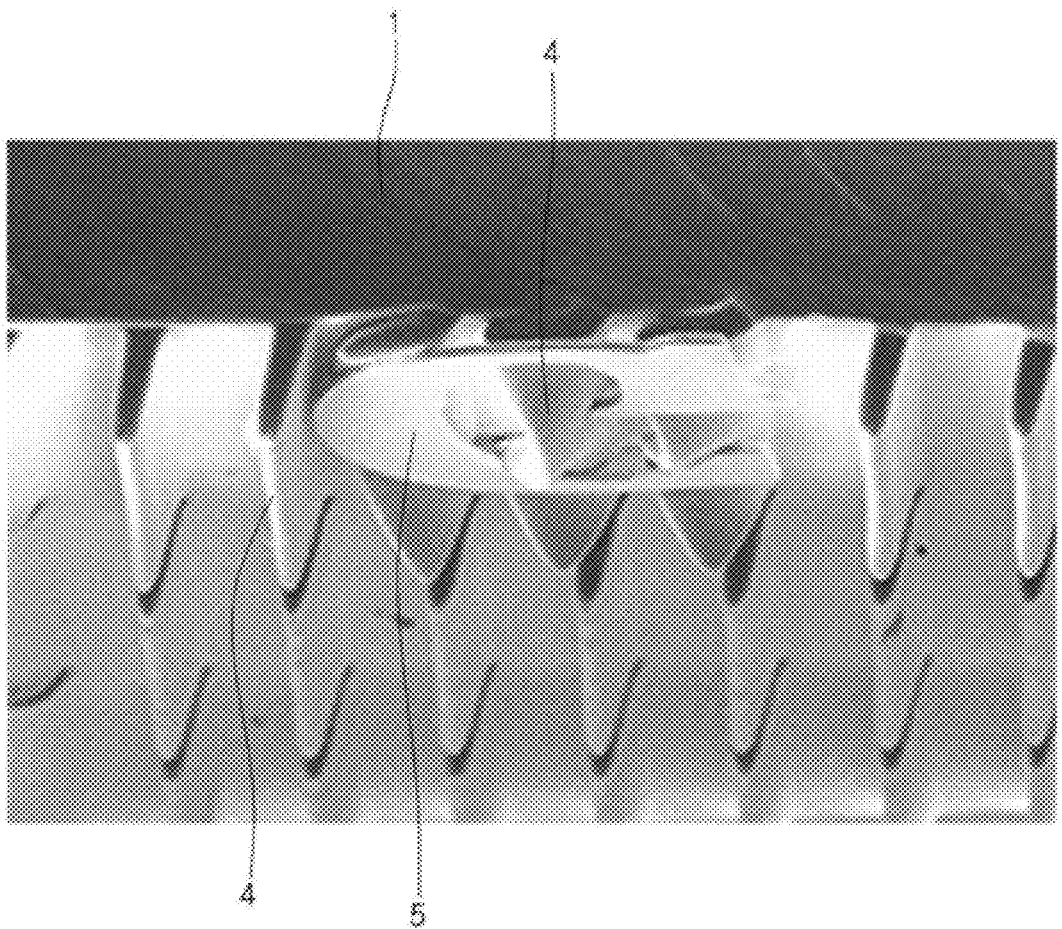
Figure 9:
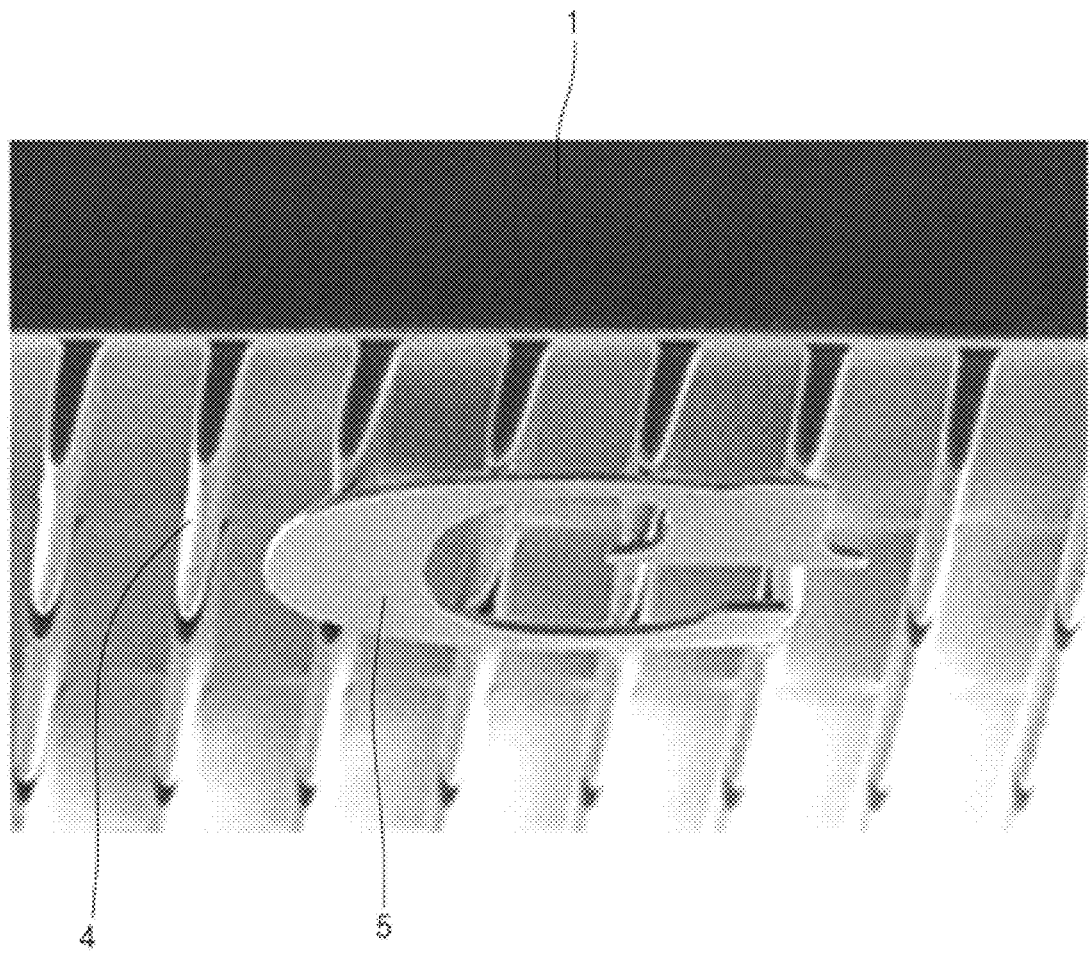
Figure 10:
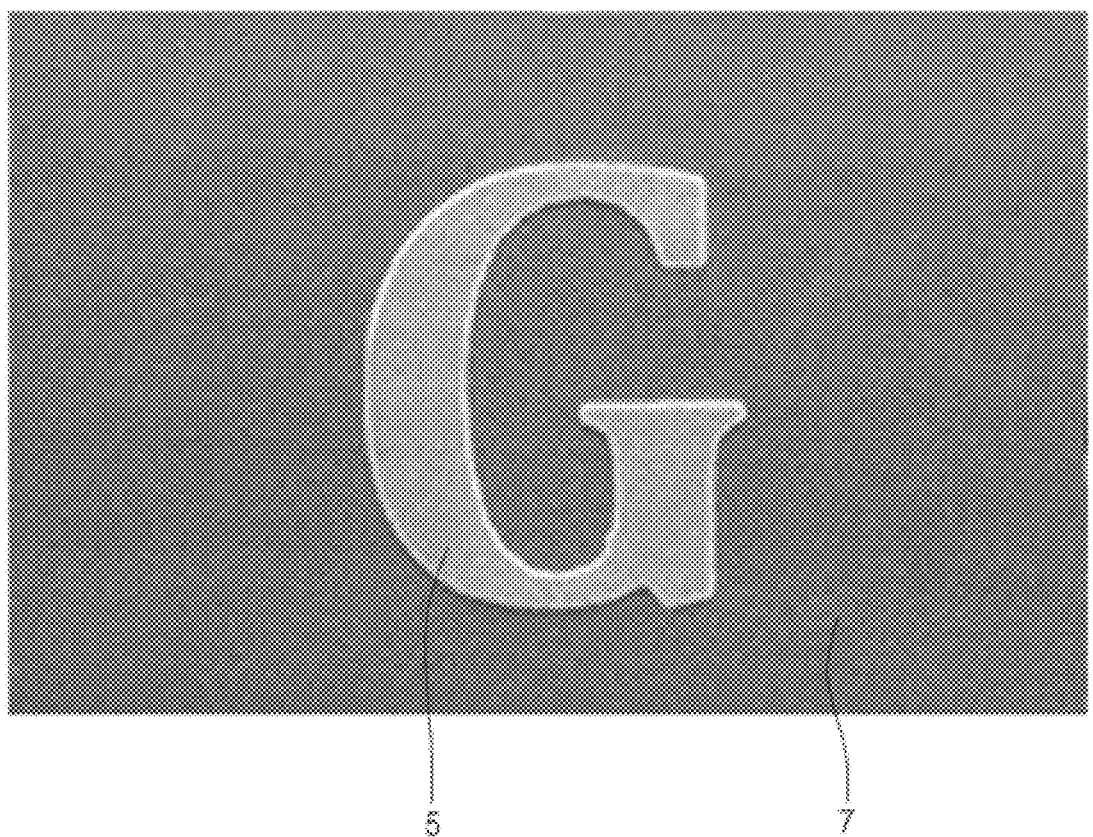

Referring to FIG. 7, it can be seen that the transferring projections 4 lie down in the inclined direction to attach the micro device 5 thereto. Referring to FIG. 8, the transferring projections 4 are deformed to attach the micro device 5 thereto. Then, referring to FIG. 9, it can be seen that the micro device 5 is still attached firmly to the transferring apparatus 1 while the transferring projections 4 restore the original shape. Referring to FIG. 10, it can be seen that the micro device 5 is transferred to the target substrate 7 and sits thereon.

Figure 11:
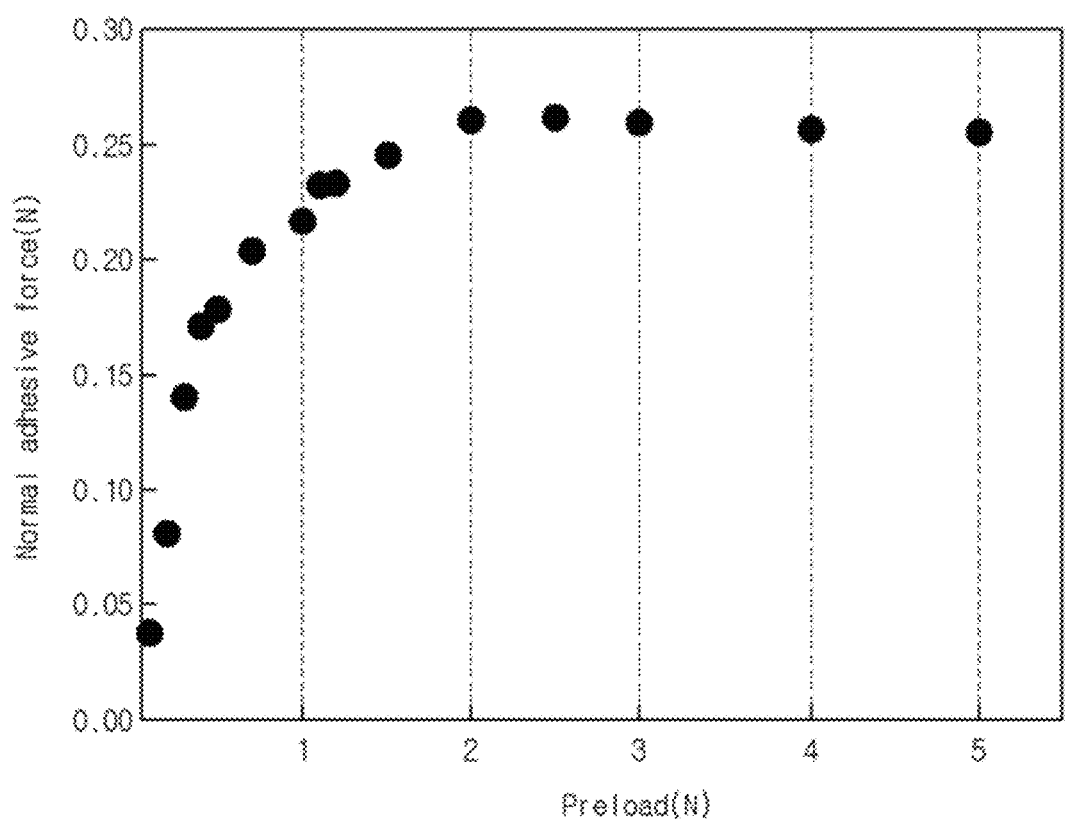
FIG. 11 is a graph showing a result of an experiment for determining the relationship between normal adhesive force and load imparted when the micro device is separated from the original substrate.

FIG. 11 is a graph showing a result of an experiment for determining the relationship between normal adhesive force and load imparted when the micro device is separated from the original substrate (preload).

As can be seen from FIG. 11, if the preload exceeds 2 N, the normal adhesive force obtained by the adhesive force between the micro device and the transferring apparatus is approximately 0.26 N and hardly changes, irrespective of any change in the preload. This is because the transferring projections 4 are fully deformed when the preload reaches 2 N, and the micro device 5 and the transferring projections 4 form a sufficient contact surface. Accordingly, the preload of 1 N to 2 N will do. A preload above 2 N is not desirable since the transferring projections may be permanently deformed or the micro device may be damaged.

In the experiment of separating the micro device shown in FIG. 11, the transferring apparatus was retracted at the angle of 60° at the retraction speed of 200 μm/s.

Figure 12:
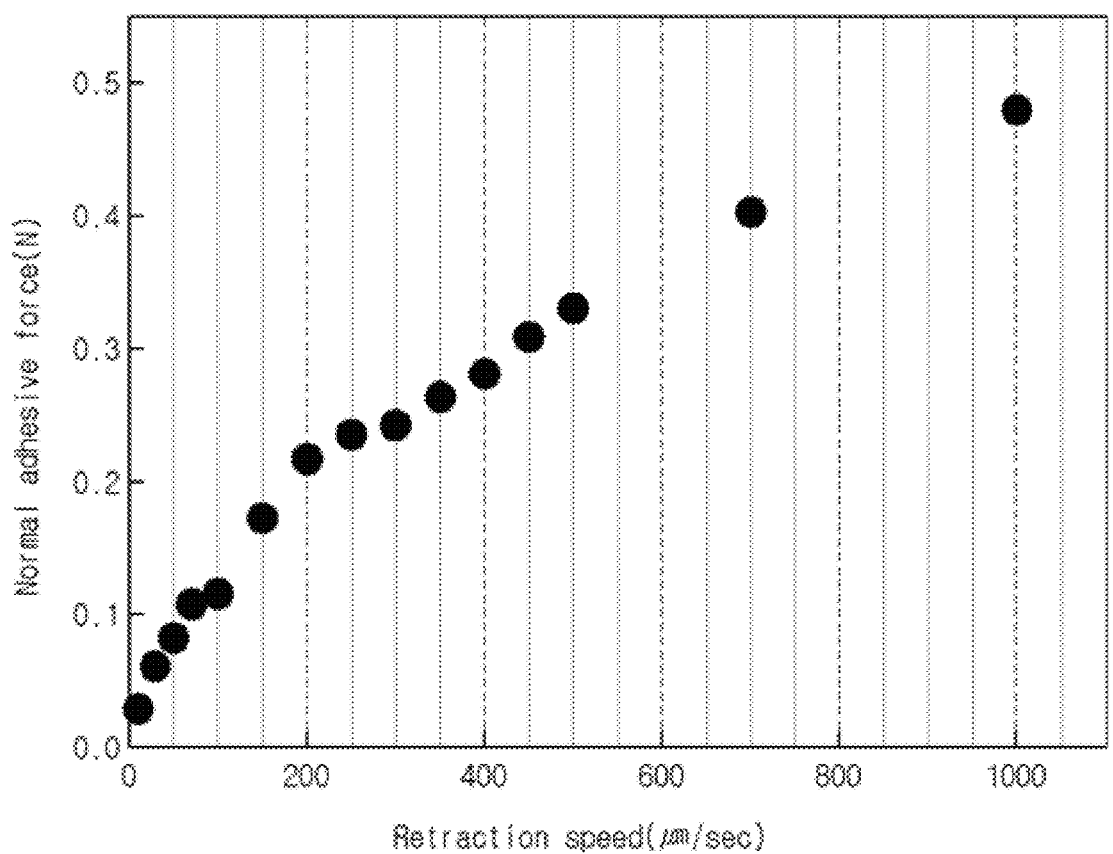
FIG. 12 is a graph showing a result of an experiment for determining the relationship between normal adhesive force and speed at which the transferring apparatus is retracted when the micro device is separated from the original substrate.

FIG. 12 is a graph showing a result of an experiment for determining the relationship between normal adhesive force and speed at which the transferring apparatus is retracted when the micro device is separated from the original substrate.

As can be seen from FIG. 12, the normal adhesive force between the micro device and the transferring apparatus increases with the speed. Accordingly, it would be understood from the result of the above experiment that the transferring apparatus can handle a micro device with a larger load by controlling the speed at which it is retracted.

In the experiment of separating the micro device shown in FIG. 12, the transferring apparatus was retracted at the angle of 60° under the preload of 1 N.

Figure 13:
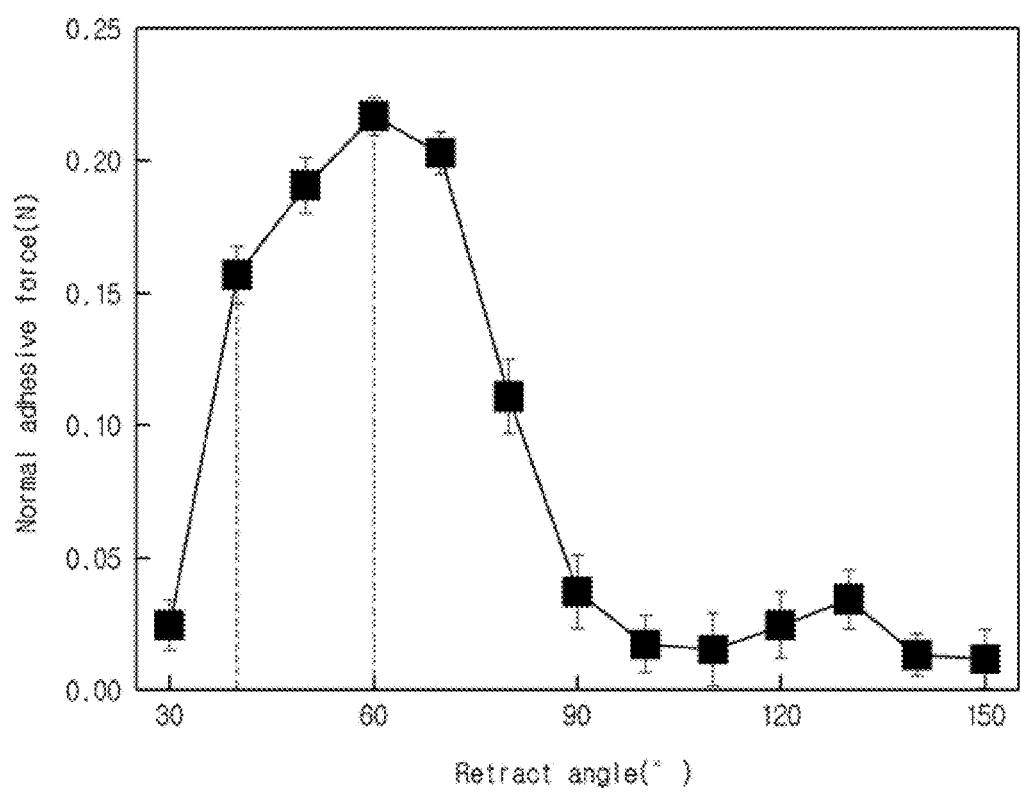
FIG. 13 is a graph showing a result of an experiment for determining the relationship between normal adhesive force and retraction angle when the micro device is retracted.

FIG. 13 is a graph showing a result of an experiment for determining the relationship between normal adhesive force and retraction angle when the micro device is retracted. The experiment was conducted by increasing the angle by 10°.

As can be seen from FIG. 13, the normal adhesive force between the micro device and the transferring apparatus increases with the angle at which the transferring apparatus is retracted until the angle θ_retract approximates the inclined direction. Beyond the inclined angle, the normal adhesive force decreases abruptly. At the angle of 100°, the normal adhesive force decreases to approximately 1/13 of the maximum. In this experiment, the angles shown in FIGS. 4 and 6 have been referenced as the criterion for the angle at which the transferring apparatus is retracted.

According to a result of the experiment, the retraction angle θ_retract_1 is preferably between 40° and 75° when the micro device 5 is separated from the original substrate 6, and the retraction angle θ_retract_2 is preferably 90° or greater when the micro device 5 is mounted on the target substrate 7. In other words, with respect to the normal direction to the base 2, a relatively large adhesive force is obtained when the transferring apparatus is retracted in the inclined direction of the transferring projections 4, and a small adhesive force is obtained when the transferring apparatus is retracted in the direction different from the inclined direction of the transferring projections 4.

In the experiment of FIG. 13, the load was 1 N, and the retraction speed of the transferring apparatus was 200 μm/s.

Figure 14:
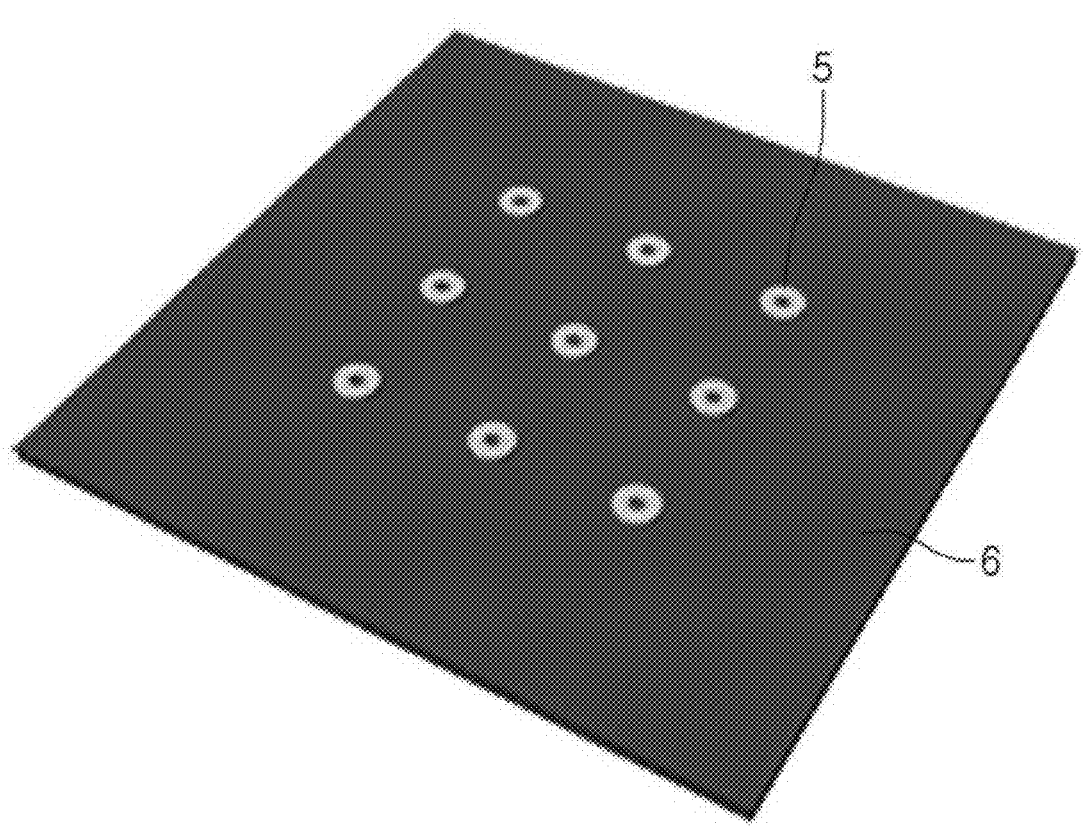
FIGS. 14 to 16 show effects that can be achieved by employing a driving device with capability of three-dimensional position control to the transferring apparatus according to an exemplary embodiment of the present disclosure.
Figure 15:
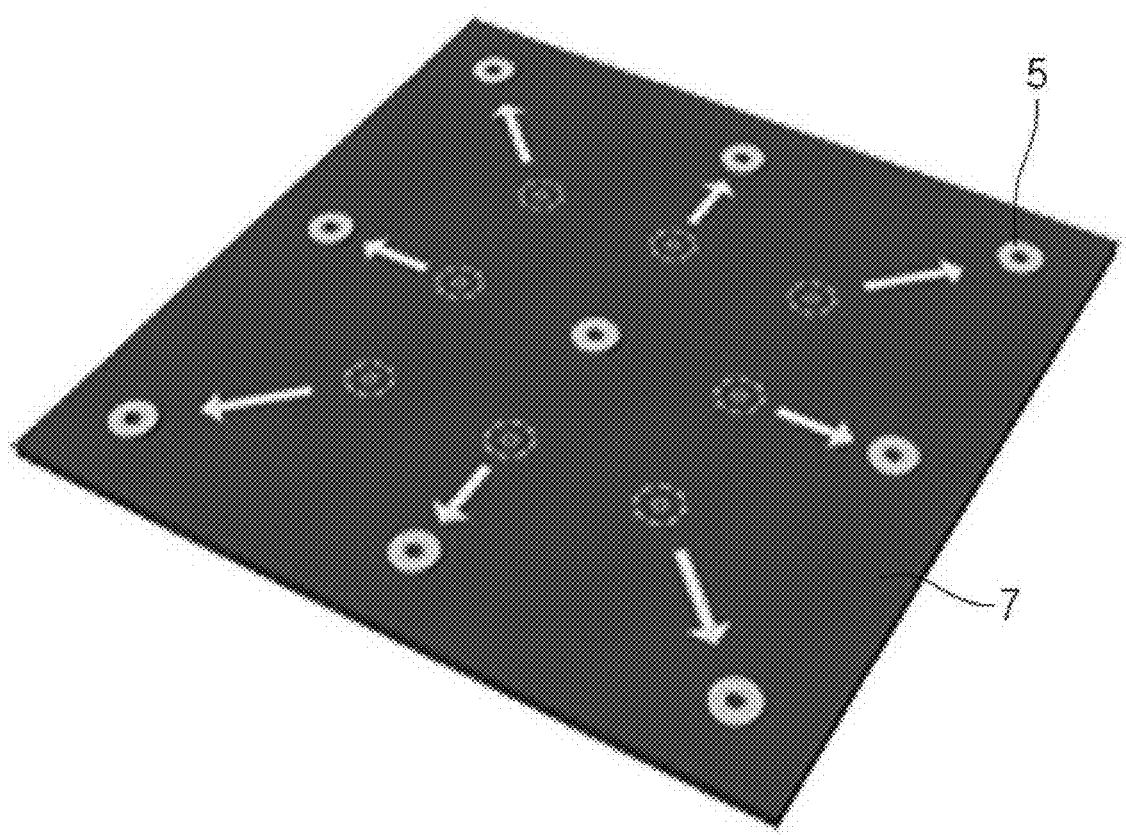
Figure 16:
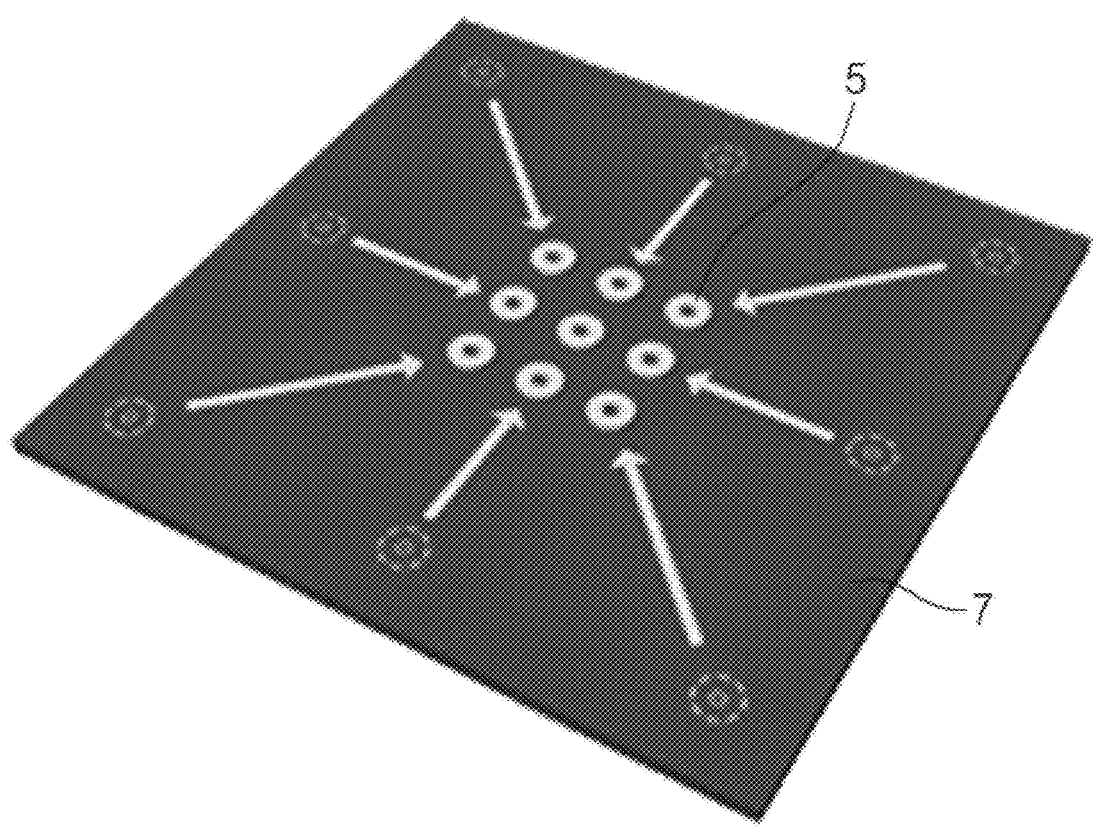

FIGS. 14 to 16 show effects that can be achieved by employing a driving device with capability of three-dimensional position control to the transferring apparatus according to an exemplary embodiment of the present disclosure.

FIG. 14 shows an original substrate 6 on which micro devices 5 are disposed. FIG. 15 is a conceptual view for illustrating how the micro devices 5 are mounted at desired positions on a target substrate 7 having lower mounting density, and FIG. 16 is a conceptual view for illustrating how the micro devices 5 are mounted at desired positions on a target substrate 7 having higher mounting density.

FIGS. 17 to 23 are views for illustrating a method for fabricating a micro device transferring apparatus.

Figure 17:
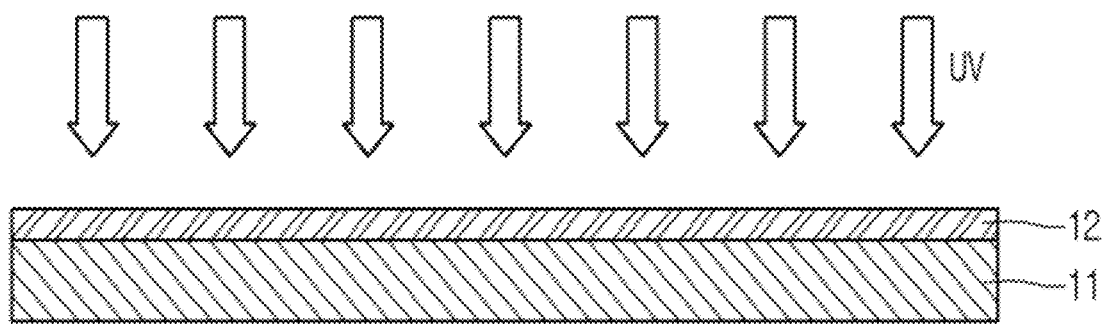
FIGS. 17 to 23 are views for illustrating a method for fabricating a micro device transferring apparatus.

Referring first to FIG. 17, a photosensitive material is applied onto a substrate 11. Then, ultraviolet ray is irradiated onto the photosensitive material to cure it, forming an adhesive layer 12. The photosensitive material may be SU-8. The substrate 11 may be a transparent glass substrate. This is to prevent deformation of molds due to reflection of ultraviolet ray from the substrate 11 in the subsequent process of forming the molds (denoted by reference numeral 16 of FIG. 21).

Figure 18:
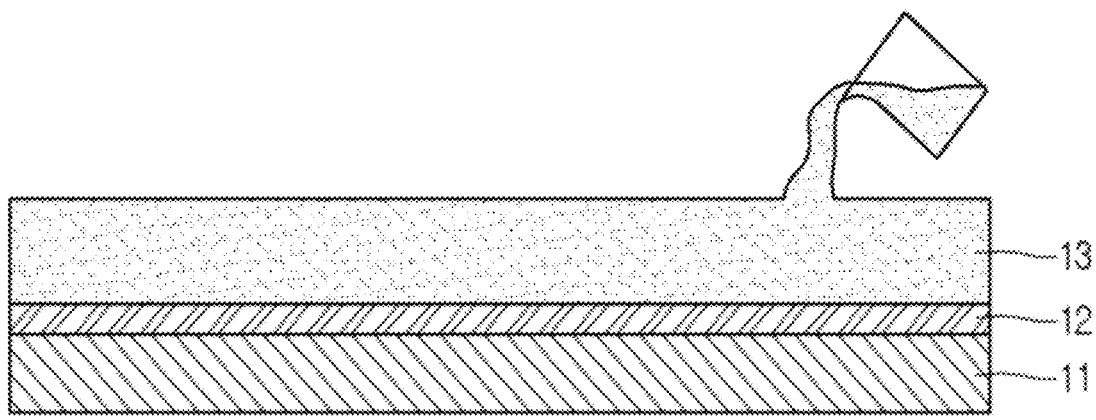
Figure 19:
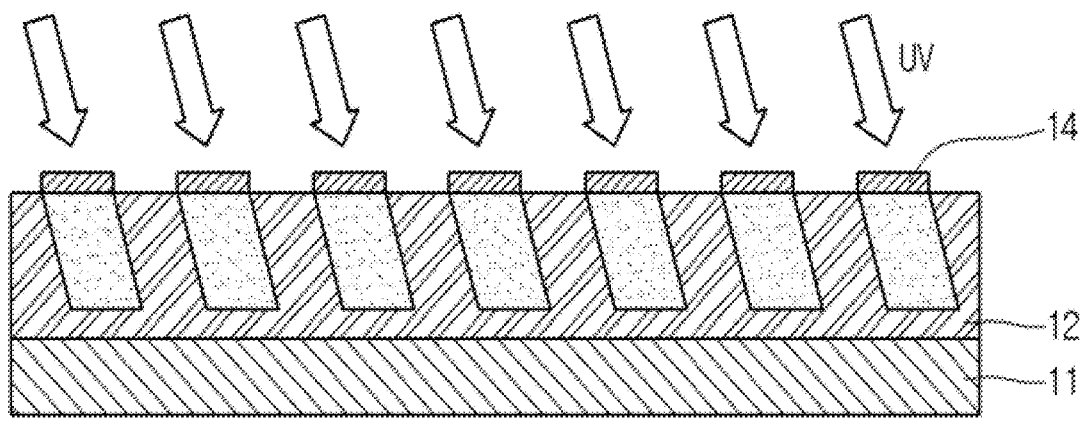

Referring to FIG. 18, a photosensitive material layer 13 is applied on the adhesive layer 12 so that the former is thicker than the latter. Referring to FIG. 19, a photoresist 14 is applied thereon in a predetermined pattern. Subsequently, ultraviolet ray is irradiated onto the photosensitive material layer at a predetermined inclined angle, e.g., 60°, to cure a part of the photosensitive material layer.

Figure 20:
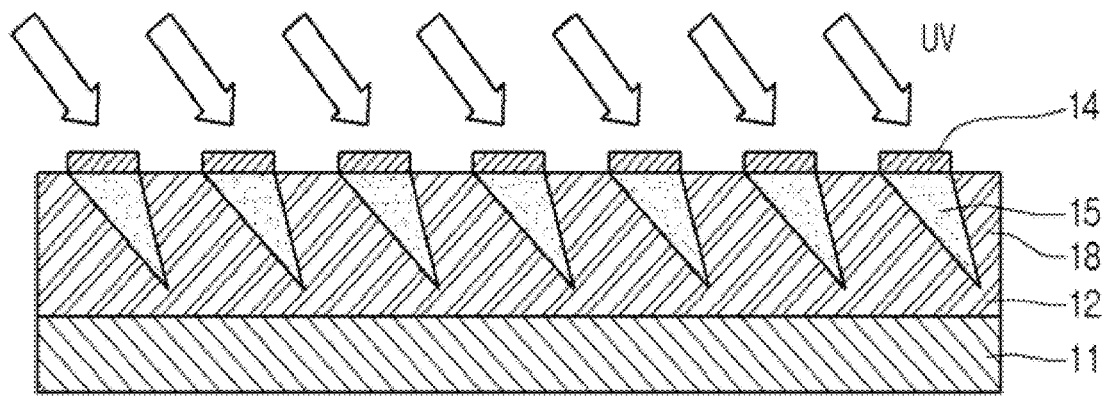

Referring to FIG. 20, while the photoresist 14 stays where it is, ultraviolet ray is irradiated at anther angle, e.g., 45°, onto the photosensitive material layer 13, to cure a part thereof again. As a result of the above processes, the photosensitive material layer 13 may be divided into a cured layer 18 by the ultraviolet ray and removable portions 15 not cured by the ultraviolet ray.

The removable portions 15 are not cured by the ultra violet ray since they are blocked by the photoresist 14. The removable portions 15 may be removed in a later process. The removable portions 15 have a roughly triangular shape, each of which may work as a mold for forming the respective transferring projections 4.

As described above, molds for forming the transferring projections 4 can be provided conveniently by simply changing the directions in which ultraviolet ray is irradiated, with the same photoresist 14.

As described above, a larger angle made by the base 2 and one side of the cross-section of the body 41 is 72°, and a smaller angle made by the base 2 and the other side of the cross-section of the body 41 is 65° However, the angle at which the ultraviolet ray is irradiated in the method for fabricating a transferring apparatus are 60° and 45°. This is because specific feature of cured photosensitive material differs due to diffraction of the ultraviolet ray.

Figure 21:
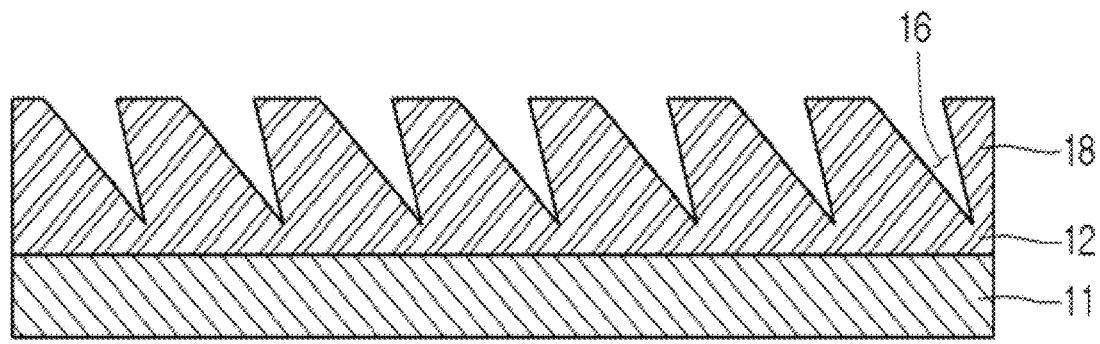

Referring to FIG. 21, after the photoresist 14 and the removable portions 15 are removed, the substrate 11, the cured layer 18 integrally formed on the substrate 11 and the adhesive layer 12 remain. The cured layer 18 may include molds 16 for forming the transferring projections 4.

Figure 22:
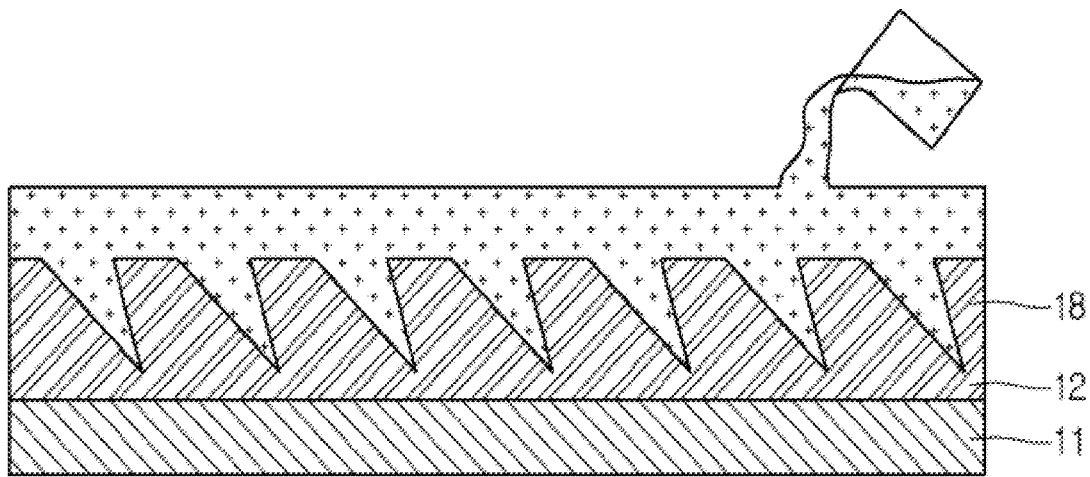
Figure 23:
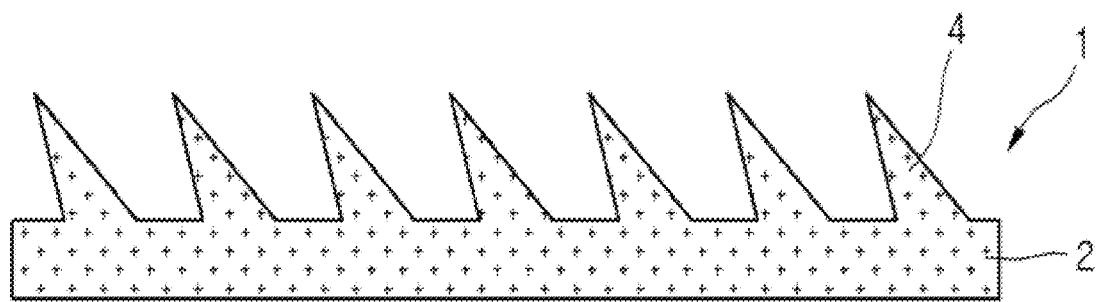

Referring to FIG. 22, an elastomeric material such as PDMS is applied onto the cured layer 18 and is cured for a predetermined time period. Then, the cured elastomeric material is taken out of the cured layer 18, which is a transferring apparatus 1 having the base 2 with the transferring projections 4 protruding therefrom. Although the end 42 of each of the transferring projections 4 are shown as having a sharp tip for convenience of illustration, the end of each of the molds 16 may be rounded in reality due to diffraction of ultraviolet ray. FIG. 23 shows a resulting transferring apparatus.

According to an exemplary embodiment of the present disclosure, there is provided a method for fabricating a micro device transferring apparatus, by which the transferring apparatus can be conveniently and simply manufactured.

According to an exemplary embodiment of the present disclosure, a micro device can be simply transferred from a substrate to another. In particular, the transferring apparatus can be used repeatedly, without requiring any feature on a target substrate. Accordingly, the transferring apparatus can be widely applicable to a variety of industrial fields such as printing, mounting electronic devices and wire structure.

According to the present disclosure, the adhesion between a micro device and a target substrate can be enhanced, and a transferring apparatus can be used repeatedly and simply controlled so that the cost for handling the micro device can be saved. In addition, the positions of micro devices can be scaled in multiple dimensions, so that the micro devices can be mounted in a scalable manner.

What is claimed is:

1. A micro device transferring apparatus comprising:
   a base; and
   a stamping array disposed on the base,
   wherein the stamping array comprises at least two transferring projections protruding from the base in an inclined direction with respect to a normal line to the base at a predetermined spacing therebetween, and
   wherein a shape of the transferring projections is a flap-like shape.

2. The transferring apparatus of claim 1, wherein at least one of the at least two transferring projections is disposed in a direction along a horizontal plane of the base.

3. The transferring apparatus of claim 1, wherein the at least two transferring projections are arranged in a direction at a regular spacing on a horizontal plane of the base.

4. The transferring apparatus of claim 1, wherein the at least two transferring projections are arranged in a lateral direction and a longitudinal direction at a regular spacing on a horizontal plane of the base.

5. The transferring apparatus of claim 1, wherein at least one of the at least two transferring projections is made of an elastomeric material.

6. The transferring apparatus of claim 1, wherein at least one of the at least two transferring projections comprises a body narrowing away from the base, and a rounded end formed at a tip of the body.

7. The apparatus of claim 1, wherein the at least two transferring projections have a scale ranging from tens of micrometers to hundreds of micrometers.

8. The transferring apparatus of claim 1,
   wherein an adhesive force between the transferring projections and the micro device is adjusted by varying at least one of a retraction direction of the transferring projection, a retraction speed of the transferring projections and a load imparted on an interface between the transferring projections and the micro device with the micro device attached to the transferring projections, thereby controlling the attaching/detaching of the micro device to/from the transferring projections.

9. A method of transferring a micro device, the method comprising:
attaching a micro device to the transferring apparatus of claim 1 by bring the transferring projections of the transferring apparatus in contact with the micro device to impart a load thereon;
retracting the transferring apparatus in a first direction to separate the micro device from an original location;
bring the micro device in contact with a target substrate; and
retracting the transferring apparatus in a second direction to separate the micro device from the transferring apparatus.

10. The method of claim 9,
wherein the first direction is the same as the direction in which the transferring projections are inclined, and the second direction is different from the direction in which the transferring projections are inclined.

11. The method of claim 9, wherein a speed at which the transferring projections are retracted in the first direction or the second direction is several hundreds µm/s.

12. A method for fabricating the micro device transferring apparatus according to claim 1, the method comprising:
forming a mold in a substrate; and
injecting PDMS into the mold to form the transferring apparatus,
wherein the forming the mode in the substrate comprises
applying a photosensitive material onto the substrate,
applying a photoresist, and
irradiating light onto the photosensitive material at two different directions with the photoresist applied.

13. The method of claim 12, wherein the substrate is a transparent glass substrate.

14. The method of claim 12, further comprising:
forming an adhesive layer prior to the applying the photosensitive material.

\* \* \* \* \*